April 20, 1965     K. J. KNUDSEN     3,179,885
RESISTIVE NETWORK TEMPERATURE COMPENSATOR USING
RESISTORS HAVING POSITIVE, NEGATIVE, AND ZERO
TEMPERATURE CHARACTERISTICS
Filed June 14, 1961

INVENTOR.
Knud J. Knudsen
BY
AGENT

United States Patent Office 3,179,885
Patented Apr. 20, 1965

3,179,885
RESISTIVE NETWORK TEMPERATURE COMPENSATOR USING RESISTORS HAVING POSITIVE, NEGATIVE, AND ZERO TEMPERATURE CHARACTERISTICS
Knud J. Knudsen, Middlebury, Conn., assignor to Lewis Engineering Company, Naugatuck, Conn., a corporation of Connecticut
Filed June 14, 1961, Ser. No. 117,194
8 Claims. (Cl. 324—105)

This invention relates to devices which are adapted to compensate for changes in ambient temperature in electrically responsive indicators.

Various types of cold junction compensators for use with thermocouple circuits which measure temperatures, effect controls, etc. are well known and in widespread use. The present invention concerns improvements in such cold junction compensators, and also in compensators for use with D'Arsonval type temperature or other indicators where it is desired to effect compensation for copper resistance variations due to changes in ambient temperature.

One object of the invention is to provide a novel and improved resistive-type ambient temperature compensator for thermocouples, D'Arsonval indicator and/or control circuits and the like, wherein the actual values of a particular temperature-responsive resistive means which is employed are not critical.

In accomplishing this there is provided a novel resistive network including stable or zero-coefficient resistors and comprising a series-parallel circuit in one of the parallel branches of which a temperature-responsive resistor of negative temperature characteristic is disposed, said resistor decreasing in its resistance value with temperature increases. The particular value assigned to this resistor of negative characteristic is not critical in effecting the final result, and the circuit is operative for the purpose specified merely when the maximum and minimum values of this resistor have a fixed relationship to the sum of the values of two stable or zero coefficient resistors used in the series-parallel circuit. Another way of stating this is that values of the resistor of negative temperature coefficient are in a range which satisfies the condition that the ratio of two specified changes in the overall resistance of the series parallel circuit (which changes are those effected when going from one of the two desired temperature extremes to an intermediate point and then from said intermediate point to the other extreme) times the ratio of the two corresponding changes in resistance of the resistor of negative characteristic, is equal to the ratio represented by the sums of the values of the said three resistors respectively at the said temperature extremes.

Another object of the invention is to provide an improved ambient temperature compensator as above set forth, which enables a very high degree of accuracy in readings and/or control to be had.

A further object of the invention is to provide an advantageous compensator in accordance with the foregoing, wherein the values of the various resistor components may be precisely computed and predetermined beforehand, to provide the desired compensation characteristic.

A feature of the invention resides in the provision of an improved ambient temperature compensator having the above attributes and advantages and which is nevertheless simple in construction, small and compact, light in weight, economical to fabricate and produce, and reliable in operation at all times.

In the accompanying drawings, showing several embodiments of the invention:

Figure 1:
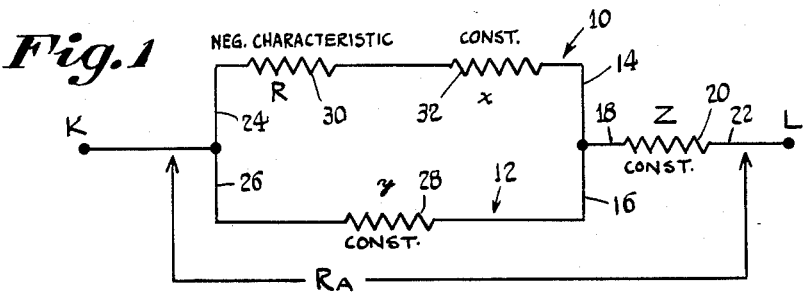
FIG. 1 is a schematic circuit diagram of a resistive network adapted to compensate for changes in ambient temperature in connection with a D'Arsonval movement, as provided by the invention.
Figure 3:
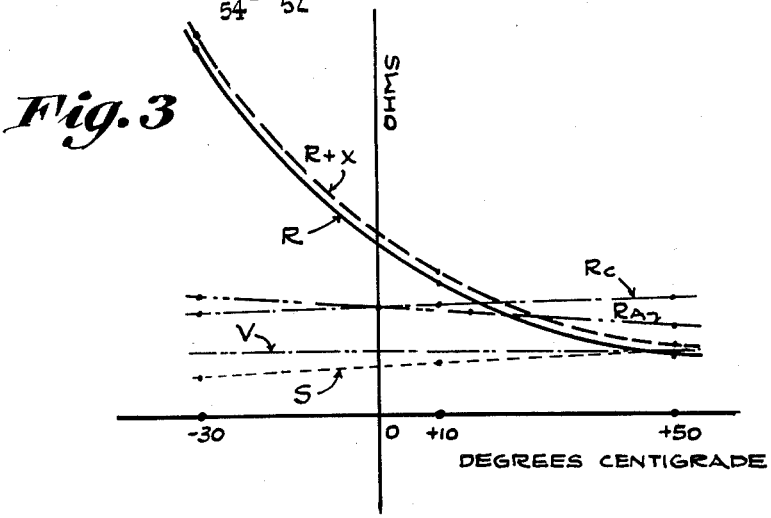
FIG. 3 is a chart or graph showing resistance versus temperature curves relating to the circuit diagrams of FIGS. 1 and 2.

Referring first to FIGS. 1 and 3, the network shown therein is seen to comprise a series-parallel circuit involving stable or zero temperature coefficient of resistance components in conjunction with a resistor of negative characteristic. The network of FIG. 1 has utility in connection with temperature or other indications and/or control devices of the D'Arsonval type, where it is required that compensation be effected for changes in the resistance of copper conductors. In such instruments, where extreme accuracy of readings and calibration is required it becomes necessary to offset the effect of changes in ambient temperature, since such changes effect appreciable excursions or variations in the resistance of components, lead wires, etc. making up the indicator. As is well known, copper has a positive temperature coefficient of resistance which follows virtually a linear law or formula. The network shown in FIG. 1 is intended to be placed in series with the coil of a D'Arsonval movement, to obtain a three point coincidence with the true temperature curve while having correspondingly small errors or departures at intermediate temperatures.

Referring now specifically to the FIG. 1 circuit, terminals K and L are indicated for connecting the resistive network in series in the D'Arsonval indicator coil circuit. The resistive network comprises a pair of parallel branches 10 and 12 connected at one pair of corresponding ends 14 and 16 to one end 18 of a stable series resistor 20 of substantially zero temperature coefficient of resistance. The resistor 20 is also labelled with the letter Z for convenience in following formulas and computations as given below. The resistor 20 may be of any suitable formulation or alloy, that known by the trade name "Constantan" having been found suitable. The remaining end or connection 22 of the resistor 20 is joined to the terminal L.

The remaining two corresponding ends 24 and 26 of the parallel branches 10 and 12 are connected together and to a second terminal indicated by the letter K.

The parallel branch 12 is constituted of a resistor 28 of substantially zero temperature coefficient of resistance, and the remaining parallel branch is constituted of a resistor 30 of negative characteristic, such resistor decreasing in value with an increase in temperature. The branch 10 further comprises a second stable resistor 32 of zero temperature coefficient of resistance, which is connected in series with the negative characteristic resistor 30. The resistors 28, 30 and 32 have been additionally given the letters R, y and x respectively for convenience in following formulas set forth below.

Further, in accordance with the invention, the resistor 30 of negative characteristic is of the type which has a negative temperature coefficient, and its value is not critical. Such a resistor may be that known commercially as "Globar." Advantageously, the resistors 20 and 28 may have values which are substantially close to each other, as will be later brought out in detail.

Preferably also the values of the resistors 28 and 32 of zero temperature coefficient of resistance advantageously have a ratio of between 5 to 1 and 6 to 1.

I have found that with the compensating resistive network as thus set forth in FIG. 1 extreme accuracy of calibration may be had with a D'Arsonval type temperature or other indicator, when the network is placed in series with the D'Arsonval coil.

In the chart of FIG. 3, temperature versus resistance curves are given for the resistor R, the combined resistors R and $x$ and the resultant network resistance indicated in the figure as $R_A$. It will be observed from the curves that the rate of change of the resistor 30 of negative characteristic is very appreciable in the range of from minus 30° to plus 50° centigrade, and for such temperature range the resistor R may vary from a value of approximately 1500 ohms to approximately 9000 ohms. The 1500 ohm value would be approximately at plus 50° centigrade, whereas the 9000 ohm value would be at approximately minus 30° centigrade.

In connection with such a resistor of negative characteristic, the proper values of the resistors $x$, $y$ and $Z$ in FIG. 1 may be computed as follows:

The required resistance will be that measured between the terminals K and L, which is indicated in FIG. 1 as $R_A$. Such required resistance, which includes the value of the resistor Z, may be fixed by assigning a specific value to Z; the latter is chosen to have a value of approximately 1,544 ohms. $a$, $b$ and $c$ are known values of the resistor 30 of negative characteristic (indicated also by the letter R) at three different significant temperatures. For example, such resistor may have a high temperature value of approximately 1500 ohms or thereabouts, a nominal temperature value of approximately 3300 ohms or thereabout, and a low temperature value of approximately 9000 ohms or thereabouts. In an actual piece of equipment, the value of resistor 30 at minus 30° centigrade was measured at 9,141.40. Its value at plus 10° centigrade was measured at 3,345.3, and its value at plus 50° centigrade was measured at 1532.2. A, B and C designate the corresponding overall resistances between the terminals K and L at the above three specific, different temperatures, where A is greater than B and B is greater than C. From basic network computation, it is seen that $$A = \frac{(a+x)y}{a+x+y} + Z$$

$$B = \frac{(b+x)y}{b+x+y} + Z$$

and $$C = \frac{(c+x)y}{b+x+y} + Z$$

Then A−B (which is hereinafter designated "d") =

$$\frac{(a+x)y}{a+x+y} - \frac{(b+x)y}{b+x+y} = \frac{y^2(a-b)}{(a+x+y)(b+x+y)}$$

And

B−C (which is hereinafter designated "e") =

$$\frac{(b+x)y}{x+y+b} - \frac{(c+x)y}{c+x+y} = \frac{y^2(b-c)}{(b+x+y)(c+x+y)}$$

Then $$\frac{e}{d} = \frac{y^2(b-c)(a+x+y)(b+x+y)}{(b+x+y)(c+x+y)y^2(a-b)} = \frac{(b-c)(a+x+y)}{(a-b)(c+x+y)}$$

and $$\frac{e(a-b)}{d(b-c)} = \frac{a+x+y}{c+x+y}$$ (which may be called "$f$")

Then $a+x+y = fc+fx+fy$; further reduction gives $x = \dfrac{a-fc}{f-1} - y$

Let $$g = \frac{a-fc}{f-1}$$

Substituting, we find that $x = g - y$.

From the above, where $$d = \frac{y^2(a-b)}{(a+x+y)(b+x+y)}$$

it is found that when substituting $g-y$ for $x$ $$d = \frac{y^2(a-b)}{(a+g)(b+g)}$$

Solving for $y$ $$y = \sqrt{\frac{d(a+g)(b+g)}{(a-b)}}$$ (since $y$ must be a positive figure)

It follows also that:

$$Z = A - \frac{(a+x)y}{a+x+y}$$

It should be noted that A−B represents the change in resistance between the terminals K and L as the temperature goes down from +50 to +10° centigrade. Also, B−C represents the change in resistance between the terminals K and L as the temperature drops from +10° centigrade to −30° centigrade. Accordingly, the quantity $e/d$ is the ratio represented by two changes in the overall resistance between the terminals K and L which is effected when going from one of the two desired temperature extremes to an intermediate point and then from said intermediate point to the other extreme. Also, for these temperature values the quantity $a-b$ over the quantity $b-c$ represents the ratio of corresponding changes in the resistance of the negative-characteristic resistor R (or 30). The product of these two ratios, as seen above, has been given the letter "$f$." This product, represented by the letter $f$, (as seen from above) is equal to the ratio of the sums of the values of the three resistors R, $x$ and $y$ at the two temperature extremes, since "$a$" is the value of R when its temperature is −30° and "$c$" is the value of R when its temperature is +50°. This condition must be satisfied for the network of FIG. 1 to be properly operative for the desired purposes.

Another way of saying this is that the quantity "$g$" given above should be larger than the resistance of the resistor $y$ (or 28), from $x=g-y$. Further, in accordance with the invention, the actual values $a$, $b$ and $c$ of the resistor R are not critical and will provide the desired final end result when $g$ is larger than $y$ and when the ratio between the values $a$, $b$ and $c$ remains the same.

Using the above formulas, with the values $a$, $b$ and $c$ for the resistor R as given, and considering the three temperature points of −30° centigrade, +10° centigrade and +50° centigrade, the following values are given, in connection with the resistive network circuit of FIG. 1.

A (for a temperature of −30° C.)=2,855.7412 ohms
B (for a temperature of 10° C.)=2,616.2306 ohms
C (for a temperature of +50° C.)=2,370.0113 ohms
$d$=239.5106 (=A−B)
$e$=246.2193 (=B−C)
$a$ (R at temperature of −30° C.)=9,141.40 ohms
$b$ (R at temperature of +10° C.)=3,345.3 ohms
$c$ (R at temperature of +50° C.)=1,532.2 ohms
$a-b$=5,796.1 ohms
$b-c$=1,813.1 ohms
$e \div d$=1.02801
$(e \div d) \times (a-b) \div (b-c) = f$=3.2863321
$fc$=5,035.3180
$(a-fc) \div (f-1) = g$=1,795.9254
$g+a$=10,037.3254
$g+b$=5,141.2254
$(g+a) \div (a-b)$=1.8870146$(d)$=451.96000$(g+b)=y^2$ Then, If $y^2 = 2,323,628.232$
$y = 1,524.3452$
$x = g - y = 271.5802$
$a + x = 9,412.9802$
$(a+x)y \div (a+g) = 1,311.8956$
$Z = 2,855.7412 (=A) - 1,311.8956 = 1,543.8456$

*Proof*

$B + x = 3,616.8802$
$(b+x)y \div (b+g) = 1,072.3851 + Z = 2,616.2306 = B$
$c + x = 1,803.7802$
$c + g = 3,328.1254$
$(c+x)y \div (c+g) = 826.1659 + Z = 2,370.0113 = C$ The operation of the circuit of FIG. 1 will now be readily apparent, when considering the curve $R_A$ in FIG. 3. It will be seen that from $-30°$ to $+50°$ a relatively small but substantially uniform decrease in resistance is experienced by the network, as measured between the terminals K and L. Such decrease in resistance may be used to compensate for the increased resistance of the copper of the indicator as occasioned by a rise in ambient temperature, within the range from $-30$ to $+50$. That is, a negative characteristic may be balanced out by a suitable positive characteristic, the latter being provided by the properties of the copper in the circuit.

In accordance with the invention, the series-parallel resistive network in FIG. 1 may be advantageously combined with another network incorporating such a positive temperature characteristic in order to form a high precision thermocouple cold junction or other compensation device which requires a specific characteristic. Such a combination is illustrated in FIG. 2, and temperature versus resistance curves for this combination are also given in FIG. 3.

Figure 2:
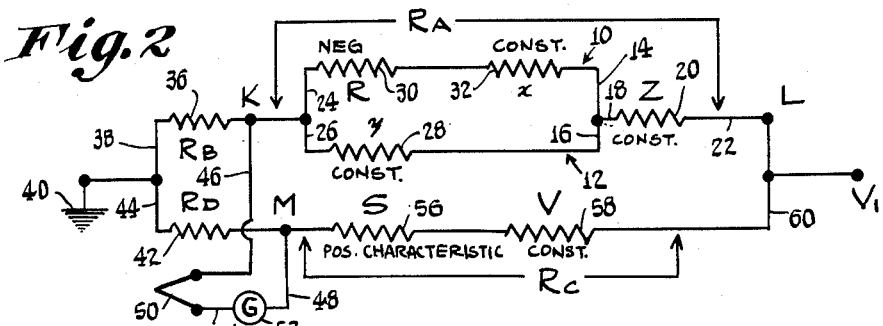
FIG. 2 is a cold-junction compensating resistive bridge network as provided by the invention, illustrating another embodiment thereof which incorporates the resistive network of FIG. 1.

The thermocouple circuit of FIG. 2 is seen to include the resistive network of FIG. 1, the terminal L of such network being connected to a terminal $V_1$ to which an operating potential is applied. The terminal K is connected to a resistor 36 (also labelled $R_B$ for convenience in formulation), which resistor is connected by a wire 38 to a ground or negative return 40 associated with the potential source connected to $V_1$. The circuit of FIG. 2, which is of the bridge type, thus has two legs of the bridge constituted by the resistor 36 on the one hand and the series-parallel resistive network indicated generally by the designation $R_A$ on the other hand. A third leg of the bridge circuit comprises a resistor 42 (also labelled $R_D$) connected by a wire 44 to the wire 38, the other end of the resistor 42 being connected to a terminal M which, with the terminal K, represent two "corners" of the bridge. The terminals K and M are connected by wires 46 and 48 respectively to a thermocouple 50 and a galvanometer-type instrument 52, the latter being joined by a wire 54 to the thermocouple 50. The fourth or remaining leg of the bridge (indicated generally by the designation $R_C$) comprises series connected resistors 56 and 58 (also labelled respectively S and V), the resistor 56 being connected to the terminal M and the resistor 58 being connected by a wire 60 to the voltage supply terminal $V_1$.

The resistor 56 has a positive temperature characteristic and may be advantageously constituted of nickel which experiences an increase in resistance with increased temperature. The resistor 58 has a zero temperature coefficient of resistance, and may be constituted of Constantan.

I have found that a bridge circuit as above constituted provides high precision cold junction compensation without involving critical values of the resistor 30 of negative characteristic. Instead, the actual value of the resistor 30 may be different from that chosen by several ohms or so without adversely affecting the compensation, just as long as the value of 30 is within such limits that "g" is larger than "y" and the ratio between the values $a$, $b$ and $c$ remains the same, as already mentioned above.

Since the value of Z is high, on the order of 1,500 ohms at the least, this being also true of the resistor $y$, and since the value of R starts at 1,500 ohms and goes up to better than 9,000 ohms, the value of the latter is not especially critical because of the high ohmages involved in the circuitry.

Considering the circuit of FIG. 2, the potential between points or terminals K and M may be computed by selecting proper values for the resistor 30, so as to give complete ambient compensation for a Chromel-Alumel thermocouple for from $-40°$ centigrade to $+50$ centigrade with a maximum error of less than $.5°$ centigrade. At the same time, the actual resistance in series with the thermocople will remain constant at a value (such as 8 ohms) within plus or minus less than .5 part in a million.

The total load represented by the bridge circuit of FIG. 2 on the compensated voltage supply connected to the points $V_1$ and 40 will vary less than plus or minus .8%. In order to attain such low voltage and resistance variations it is necessary that each of the upper pair and lower pair of legs of the bridge circuit supplies approximately half of the compensation. The value of the resistor 30 may be fundamentally chosen and used if its 25° centigrade value in the specific system varies from a usual 2480 ohms to as low as 1620 ohms or as great as 9000 ohms, without in any way altering the accuracy of the final result.

If for any reason the total voltage should change 1% due to variations in load (which is virtually an impossibility), then the error in compensation at its worst would be 1% of 2.23 millivolts which means 23 microvolts, and the compensation error would be a total of less than 1° centigrade, rather than its theoretical value of .42° centigrade.

The following formulas apply to the bridge circuit of FIG. 2. The basic bridge formula is as follows:

$$I_G = V_1 \frac{R_D R_A - R_B R_C}{R_G(R_A+R_B)(R_C+R_D) + R_A R_B(R_C+R_D) + R_C R_D(R_A+R_B)}$$

This may be rewritten:

$$\frac{V_G}{R_G} = V_1 \frac{R_D R_A - R_B R_C}{R_G(R_A+R_B)(R_C+R_D) + R_A R_B(R_C+R_D) + R_C R_D(R_A+R_B)}$$

where:

$V_1$ = supply volts
$V_G$ = output voltage at the galvanometer terminals
$R_G$ = galvanometer resistance
$I_G$ = galvanometer current.

According to Ohm's law, $I_G = V_G/R_G$

As the resistance of $R_G$ approaches infinity it becomes necessary to rewrite this formula into a new one through the following steps:

(III)

$$V_G = V_1 \frac{R_G(R_D R_A - R_B R_C)}{R_G(R_A+R_B)(R_C+R_D) + R_A R_B(R_C+R_D) + R_C R_D(R_A+R_B)}$$

by algebraic reduction (IV)
$$V_G = V_1 \frac{R_D R_A - R_B R_C}{(R_A+R_B)(R_C+R_D) + [R_A R_B (R_C+R_D) + R_C R_D (R_A+R_B)] \div R_G}$$

as $R_G$ reaches infinity the last member of the Divider becomes Zero and we now have a simple formula which states:

(V)
$$V_O = V_G = V_1 \frac{R_D R_A - R_B R_C}{(R_A+R_B)(R_C+R_D)}$$

$V_1$ to ground is constant, and known.
$V_0$ is a desired known voltage.

Consider that $R_B$ and $R_D$ are equal and constant and known; there follows the following formula:

(VI)
$$\frac{(R_A - R_C) R_B}{(R_A+R_B)(R_C+R_B)} = \frac{V_0}{V_1}$$

or (VII)
$$\frac{(R_C+R_B) V_0}{V_1 R_B} = \frac{R_A - R_C}{R_A + R_B}$$

This may be further reduced to:

(VIII)
$$A = \frac{V^1 R_B R_C + (R_C+R_B) R_B V_0}{V_1 R_B - (R_C+R_B(V_0)}$$

It will be noted that $V_1 R_B$ is a constant.

The resistors 36 and 42 are advantageously of low value, as for example 3 ohms.

In order to have a constant resistance across the points $V_1$ and 40 (across the terminals K and M) $R_A$ should be decreased at about the same rate as $R_C$ increases. This may not be strictly necessary if $R_A$ and $R_C$ are very high as compared to $R_B$ and $R_D$. Let it be considered that a potential output of +1.2 mv. at −30° centigrade, −0.40 mv. at +10° centigrade and −2.02 mv. at +50° centigrade is wanted. If this is feasible then a Chromel-Alumel thermocouple can be completely compensated at these three points.

In the basic circuit of FIG. 2 pertaining to cold junction compensation, the corresponding values of $R_A$ and $R_C$ are 2680 ohms at balance and $R_B$ and $R_D$ are each 3 ohms. It will thus be seen that even if the sum of $R_A$ and $R_C$ change as much as 10% the resistance as measured across points K and M would change only 0.10%.

Since it is known that $V_1 = 7.2441$, the current through $R_B$ and $R_D$ at 0° centigrade $= 7.2441/(2680+3) = 2.700$ ma. Thus the millivolts across $R_D = 3 \times 2.7 = 8.1$ mv. Since the nickel-constantan arm has only two components, only two points of true coincidence can be attained, and with a resistance of 2680 ohms at 0° centigrade it is found that the best condition is obtained when the Constantan resistor V is 1512.62 ohms while the nickel resistor is 1067 ohms at 0° centigrade; this gives the following millivolts: at −30° centigrade, 8.7420523 mv.; at +10° centigrade, 7.8972076 mv. and at +50° centigrade, 7.1381106 mv.

In order to attain the correct differential millivolts of −1.2 at −30° centigrade, −0.4 mv. at +10° centigrade and −2.02 mv. at +50° centigrade it is necessary therefore to have a mv. value in the negative temperature coefficient resistor R of 8.7420523 −1.2 = 7.6020523 mv. at −30° centigrade; 7.8972076 + 0.40 = 8.29720523 mv. at +10° centigrade and 7.1381106 + 2.02 = 9.1581106 mv. at +50° centigrade.

By selecting cross-over points at −30° centigrade +10° centigrade and +50° centigrade the lowest inaccuracy is attained between −40° centigrade and +60° centigrade.

The values of A, B and C according to Formula VIII are, when reduced, as follows:

$$A = 2,855.7412$$
$$B = 2,616.2306$$
$$C = 2,370.0113$$

The operation of the bridge network of FIG. 2 will now be apparent when considering FIG. 3. As a drop in ambient temperature is experienced within the range of from +50° to −30°, the voltage between the terminals K and M will change in such a manner as to compensate for the voltage change (occasioned by ambient temperature change) of the cold junction connection means of the thermocouple 50. Whereas a drop in ambient temperature will reduce the cold junction potential it will correspondingly change the potential difference across the bridge terminals K and M, as effected by the voltage source between the ground 40 and terminal $V_1$, thereby to nullify the effect of the ambient temperature change.

It will now be understood from the foregoing that I have provided a novel and improved resistive-type ambient temperature compensator for thermocouples, D'Arsonval indicator and/or control circuits and the like, which has a number of advantages. The actual value of the temperature responsive resistor of negative characteristic which is employed, being high, is not critical, as regards changes of several ohms or so. High precision and accuracy is had in the readings and control function. The resistive network may be extremely small in size and compact, and is seen to be simple and economical to fabricate. It has been found to be reliable in its operation under adverse conditions of use.

Variations and modifications may be made within the scope of the claims, and portions of the improvements may be used without others.

I claim:

1. In a bridge, three resistive legs and an indicator circuit comprising a thermocouple and series-connected meter connected across two of said legs; and a fourth leg connected to said indicator circuit and the remaining one of said three resistive legs, said fourth leg comprising a resistive network for compensating for changes in an electrical component of the indicator circuit due to changes in ambient temperature, said resistive network including a series-parallel circuit having a pair of parallel branches connected at one pair of corresponding ends to one end of a stable series resistor of substantially zero temperature coefficient of resistance, one of said parallel branches being constituted of a constant resistor of substantially zero temperature coefficient of resistance, and the other branch being constituted of a negative characteristic resistor which decreases its resistance with an increase in temperature, connected in series with a small resistor of substantially zero temperature coefficient of resistance, said negative characteristic resistor, said constant resistor and said stable resistor having values in excess of approximately four times the value of the said smaller resistor.

2. A network as in claim 1, in which the resistor which decreases its resistance varies according to a predetermined negative temperature coefficient of resistance curve.

3. A network as in claim 2, in which the first-mentioned series resistor and the resistor constituting the said one parallel branch have values which are commensurate with each other.

4. A network as in claim 3, in which the values of the resistors of zero temperature coefficient of resistance in the parallel branches have a ratio between 5 to 1 and 6 to 1.

5. A cold junction compensating resistive bridge network having four legs, one pair of legs having substantially equal resistance values not exceeding a few ohms and having a common terminus for connection to a source of voltage, the other pair of legs having a common terminus for connection to said voltage source, one of said other pair of legs comprising positive and substantially zero temperature coefficient resistors in series and the remaining leg comprising a series parallel circuit having a pair of parallel branches connected at one pair of corresponding ends to one end of a stable series resistor of substantially zero temperature coefficient resistance, one of said parallel branches being constituted of a constant resistor of substantially zero temperature coefficient of resistance and the other branch being constituted of a negative characteristic resistor which decreases its resistance with an increase in temperature, connected in series with a smaller resistor of substantially zero temperature coefficient of resistance, said negative characteristic resistor, said constant resistor and said stable resistor having values in excess of approximately four times the value of the said smaller resistor; and an indicator circuit comprising a thermocouple and a series-connected meter connected across the said legs whose resistance values do not exceed a few ohms.

6. A bridge network as in claim 5, in which the zero and positive temperature coefficient resistors in the said one of the other legs have a ratio of approximately 1½ to 1 at zero degrees centrigrade.

7. A bridge network as in claim 5, in which the zero temperature coefficient of resistance resistors in the said one of the other legs and said one of the parallel branches and the said stable series resistor have values which are substantially within 3% of each other.

8. A bridge network as in claim 5, in which the rate of change of the resistor of negative characteristic is greatly in excess of that of the resistor of positive characteristic, with changes in temperature.

References Cited by the Examiner
UNITED STATES PATENTS

| | | | |
|---|---|---|---|
| 2,250,712 | 7/41 | Johnson | 324—105 |
| 2,443,073 | 6/48 | Knudsen | 324—105 |
| 2,871,701 | 2/59 | Knudsen | 73—361 |

WALTER L. CARLSON, *Primary Examiner.*
BENNETT G. MILLER, *Examiner.*